May 22, 1962 L. W. RICH 3,035,872
TRACTOR TRACK RAKE
Filed Nov. 25, 1959
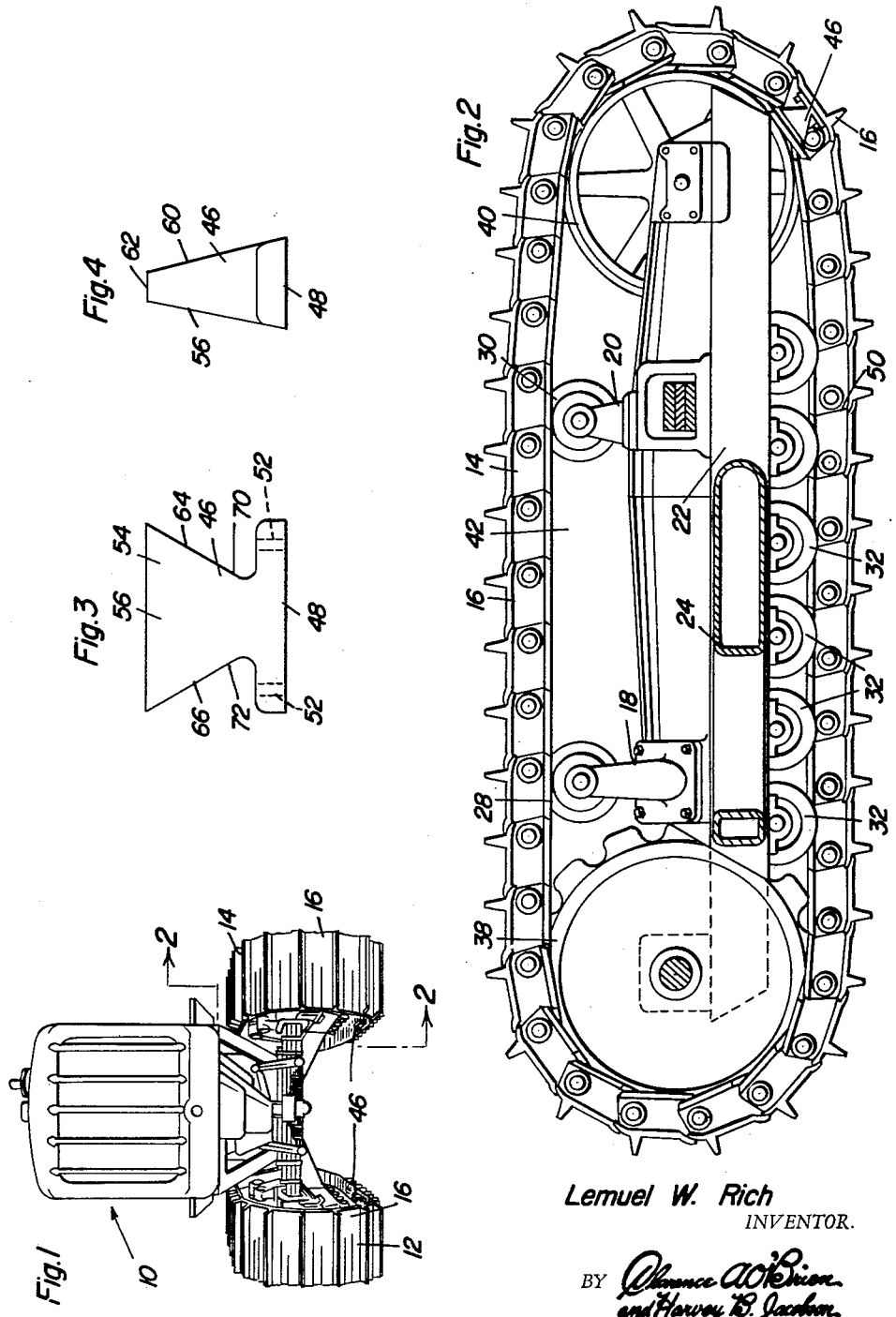
Lemuel W. Rich
INVENTOR.

United States Patent Office 3,035,872
Patented May 22, 1962

3,035,872
TRACTOR TRACK RAKE
Lemuel W. Rich, Long Creek, N.C. (Rocky Point, N.C.)
Filed Nov. 25, 1959, Ser. No. 855,362
4 Claims. (Cl. 305—12)

This invention relates to attachments for tractors and like equipment having endless treads entrained around drive wheels or sprockets.

An object of the invention is to prevent the accumulation of trash and other debris as tree limbs, small bushes, small tree roots, mud, etc. from collecting on top of the tractor side railing supports. Often debris collects in the area of the side railing supports, roller stands and rollers of a tractor, especially when the tractor is operated in swampy areas, and the extent of collection sometimes becomes so severe that the tractor has to be stopped and the trash cleaned out, otherwise the tracks will slip off or the tracks become bound.

Briefly, the invention provides an exceedingly simple device to be combined with the tracks for automatically sweeping the area of the rollers, railing supports, side railings, roller stands and rollers of the tractor. This prevents gross accumulation of trash, mud, etc. in this area, making it wholly unnecessary to ever stop the tractor during normal operation thereof or even abnormal operation under the severest condition, for example, swampy land which has a low undergrowth, for the purpose of cleaning this area.

The scraper is made of a small structural element bolted or otherwise secured to one of the tractor cleats of the track. It is located on the inner surface of a single cleat and toward the inside of the tractor.

Necessarily, the cleat must be made in different sizes to accommodate different sizes of tractor treads. Small treads will require small cleaning elements, and larger ones will require larger cleaning elements, however, all of the cleaning elements may be structurally similar except for the differences in size.

A further object of the invention is to provide a device for mechanically cleaning the area of a conventional tractor as described above, and by a very simple mechanical device. The simplicity of the invention is emphasized in that it may be manufactured at a ridiculously low cost, installed in a matter of a few minutes, and it functions satisfactorily for the entire life of the tractor treads.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front perspective view of a tractor equipped with cleaning elements in accordance with the invention.

FIGURE 2 is a sectional view on an enlarged scale and taken approximately on the line 2—2 of FIGURE 1 with the endless track illustrated in a slightly different rotated position.

FIGURE 3 is a side elevational view of the cleaning element.

FIGURE 4 is an end view of the cleaning element of FIGURE 3.

In the accompanying drawings there is an illustration of a conventional tractor 10 equipped with treads or tracks 12 and 14. These are conventional and are made up of a number of cleats 16 hingedly joined together. The typical track 14 (FIGURE 2) is shown in a way that it is structurally connected with the tractor. This illustration is merely of one conventional tractor, it being clearly understood that manufacturers' makes have certain variances in construction, however, there are numerous common features such as roller stands 18 and 20 which are spaced from each other and mechanically connected with side railing 22. The side railing support 24 is connected with the side railing and extends inwardly of the tractor. Rollers 28 and 30 are mounted rotationally on the roller stands 18 and 20 and there are lower rollers 32 located beneath the side railing and mounted in bearings supported by the side railing. The main drive sprocket wheel 38 is at one end of the endless track 14, and the idler wheel 40 is at the other end thereof. Since all of this structure is conventional, the description thereof is not completely detailed. FIGURE 2 illustrates the general area or region 42 wherein trash accumulates. Mud, small twigs, small roots, debris of various types, etc. ordinarily accumulate on the side railing, above the side railing, around the roller stands 18 and 20, over the rollers and around the rollers 28 and 30. The condition can become so bad that the track 14 binds or actually slips off the main drive sprocket 38 and/or wheel 40. Consequently, the tractor operator must, of necessity, periodically stop the tractor and clean out the trash from the general area or region 42.

The invention is embodied in a cleaning element 46 attached to a selected cleat 16 and on the inner surface thereof toward the inside of the tractor. Although more than one cleat may be used, it has been found that a single cleat 46 is sufficient to rake clean area 42. When passing beneath the rollers 32 the cleaning element 46 sweeps clean the accumulation of mud and other debris adjacent thereto. As the cleaning element 46 sweeps around the ends of the track 14, the area to the front and rear of the side railing and in the region of the sprocket and wheel 38 and 40, respectively, are cleaned. Most important, however, is the cleaning of the region 42 which prevents the great build-up of trash in an amount sufficient to bind the track 16 or worse and cause to slip off. This is the functional utility of the cleaning element.

Structurally, cleaning element 46 is made of a base 48 which actually constitutes a mounting or bolting flange so that bolts 50 may pass through the apertures 52 which extend perpendicularly through base 48. The cleaning element has a rake or blade 54 rising from base 48. The cleaning element has flat tapered sides 56 and 60 which are farther apart at the base 48 thereof than at the straight upper edge 62 of the rake. When viewed from the side (FIGURE 3) the front and rear edges 64 and 66 slope outwardly and upwardly with reference to base 46, this configuration providing front and rear pockets 70 and 72 which prevent the cleats from binding therewith as they turn around the smaller radii at the front and rear of the tread, see FIGURE 2.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a machine which has an endless track provided with a plurality of pivotally connected cleats, means including rollers and a structural support mounting the rollers for supporting and constraining the travel of said track, the improvement comprising a cleaning element, means for securing said cleaning element to one of said cleats on the interior thereof so that upon movement of said endless track said cleaning element is correspondingly moved in a constrained path of travel in the region of said means including rollers to sweep said region each time that the track travels through one cycle of operation, said cleaning element having a base and a blade extending therefrom, said blade having front and rear edges which extend inwardly to form outwardly opening pockets providing clearance for said cleats as said cleats are moved in coordination with each other during motion of said track.

2. In combination with a tractor of the type including a plurality of transversely extending plate-like cleats hingedly joined together and entrained about at least one pair of spaced aligned wheels for movement about a closed path, a cleaning element having a base removably secured to the inner surface of an end portion of one of said cleats, said cleaning element including a blade projecting inwardly and in a plane substantially parallel to the plane of said closed path.

3. For use with a tractor of the type including a plurality of transversely extending plate-like cleats hingedly joined together and entrained about at least one pair of spaced aligned wheels for movement about a closed path, a cleaning element including a base, said base having a surface adapted to overlie, conform to and be removably secured to the inner surface of an end portion of one of said cleats, a blade on said base projecting from a surface thereof remote from said one surface and substantially perpendicularly to said one surface whereby said blade will extend in a plane parallel to the plane of said closed path.

4. The combination of claim 2 wherein said blade includes front and rear inwardly divergent edges to form forwardly and rearwardly opening pockets providing clearance for said cleats as said cleats are moved in coordination with each other during motion of said track.

References Cited in the file of this patent

UNITED STATES PATENTS

| | | |
|---|---|---|
| 1,730,059 | Carvin | Oct. 1, 1929 |
| 2,385,758 | Hansen | Sept. 25, 1945 |
| 2,537,745 | Daniels | Jan. 9, 1951 |
| 2,560,307 | Slemmons | July 10, 1951 |

FOREIGN PATENTS

| | | |
|---|---|---|
| 328,932 | Germany | Sept. 11, 1919 |
| 263,161 | Great Britain | Apr. 21, 1927 |